Patented May 11, 1943

2,318,810

UNITED STATES PATENT OFFICE 2,318,810

PREPARATION OF ACID VEGETABLE JUICES

John G. Souther, Alameda, Calif., assignor to The Schwarz Engineering Company, Inc., San Francisco, Calif., a corporation of Nevada No Drawing. Application October 25, 1940, Serial No. 362,791

3 Claims. (Cl. 99—105)

This invention relates to fermented vegetable juices.

Sauerkraut and sauerkraut juice

When vegetables are packed either dry with two to three percent (2 to 3%) of sodium chloride (hereinafter referred to as salt), as in making sauerkraut, or are covered with brine of about five (5) pounds of salt to twelve (12) gallons of water, as in the preparation of dill pickles, water containing soluble and fermentable sugar is withdrawn from the raw materials. This sugar is fermented by the lactic-acid-forming bacteria which are naturally present in great numbers on the surface of the fresh material. After such fermentation has proceeded to a certain point, enough lactic acid is formed to kill the bacteria and stop the fermentation.

In the common method of manufacturing sauerkraut, cabbage is shredded, usually after discarding the outer green leaves, and the shreds are then mixed with two to three percent (2 to 3%) of salt, packed tight into containers, and allowed to stand until the fermentation is completed. It is a product of characteristic acid flavor, obtained by fermentation, chiefly lactic, of the shredded cabbage in the presence of not less than two percent (2%) nor more than three percent (3%) of salt, the presence of a moderate concentration of salt being necessary to reduce the growth of spoilage organisms and to promote the growth of lactic acid bacteria. Upon completion of the fermentation the mass usually contains not less than one and one-half percent (1.5%) of acid, expressed as lactic acid. The amount of lactic acid produced depends upon the amounts of sugar, protein and minerals present, and approximately twenty-five percent (25%) of the total acid after complete fermentation is acetic acid. The resulting solids and liquor are each a wholesome food. They are sometimes sold mixed together, and sometimes some of the liquor is removed from solids to be sold as a beverage.

As cabbage is generally harvested in the late fall when the weather is cool, it is cold when it enters the fermentation tank, and as a result fermentation is slow in starting and in progressing, so that complete fermentation may not result until the following spring.

Few factories are equipped to heat the fermentation rooms or tanks, and even if they were, the large tanks of cold cabbage would require a very long time for heat to penetrate to the center and impart to the whole batch throughout the proper temperature that is conducive to a healthy and rapid fermentation. The best temperature for this fermentation has been found to be eighty-six degrees Fahrenheit (86° F.), and when it falls below this, the activity of the bacteria is decreased.

The shredded cabbage may be heated to a temperature of eighty-eight degrees Fahrenheit (88° F.) as it enters the tanks; and by starting with cabbage at this temperature, some factories complete the fermentation within a week or ten days. When the temperature is seventy-five degrees Fahrenheit (75° F.) the fermentation to sauerkraut requires from two to three (2 to 3) weeks for completion. A lower temperature of sixty to seventy degrees Fahrenheit (60 to 70° F.) is, however, more desirable from the standpoint of quality of product, because the higher tempertures have a tendency to cause the cabbage to spoil. On the other hand, when the cabbage is packed at too low a temperature, namely thirty to sixty degrees Fahrenheit (30 to 60° F.) fermentation is retarded too much.

Rapidity of fermentation is desirable because ordinarily the more rapid it is the less will foreign or undesirable organisms have an opportunity to accomplish their fermentation, with the result that the product is either spoiled or of inferior quality. However, a speedy fermentation up to the point of completion of the sauerkraut has so far been possible only at the higher temperatures which, as stated above, have the tendency to cause spoilage.

The organisms

There are a great number of types of bacteria and yeasts normally present on cabbage, but from the standpoint of their effect on cabbage or sauerkraut they may be grouped into desirable lactic acid fermentation bacteria, the spoilage group of bacteria, and the yeasts.

The ordinary useful group of sauerkraut ferments may be classified into the lactic-acid-producing groups, namely:

Gas-producing cocci—*Leuconistoc menisteroides*
Non-gas-producing rods—*Lactobacillus pentoaceticus*, and
Gas-producing rods—*Lactobacillus cucumeres* and *plantarum*.

All of these act on the sugars of the cabbage but produce very little change in the proteins or the other constituents. They are favored by the absence of air, and thus conditions are ideal for their growth and life processes when the cabbage is packed correctly. They vary in their resistance to salt and acid. In ordinary good sauerkraut fermentation, these three types are the only ones to develop to any extent. The first type, the gas-producing cocci, grow best at seventy degrees Fahrenheit (70° F.) or lower, with two and one-half percent (2.5%) salt present. They act upon the sugars (glucose, frutose etc.), drawn out by the salt, changing part of the fermentation mass to lactic acid, acetic acid, alcohol, mannitol and carbon dioxide. When approximately seven tenths of one percent to one percent (0.7 to 1.0%) of acid has been produced these organisms are killed off. When nine tenths of one percent (0.9%) acid has been produced the amount of acetic acid present is approximately forty percent (40%) the amount of lactic acid present.

In the meantime the two other types, the gas-producing and non-gas-producing rods, are inhibited slightly by the salt content and by the low temperature of fermentation but have increased sufficiently in numbers to carry on the fermentation until one and one-half to two percent (1.5 to 2%) of acid is produced, at which point the fermentation is complete. These rod organisms produce lactic acid only from the sugars and from the mannitol produced by the gas-producing cocci. The *Lactobacilli plantarum* and *cucumeres* are not quite so resistant to acid as the non-gas-producing rods (*Lactobacillus pentoaceticus*) and are therefore slowly but finally killed off, leaving the completion of the fermentation to the last mentioned type. These organisms may carry the fermentation to as high as two and four tenths percent (2.4%) acid. They produce the same products from sugar as do the *Leuconistoc mesinteroides*.

The spoilage group are the typical soil organisms which require air for growth. They do not attack the sugars to any great extent, but rather act upon proteins and produce undesirable changes. Since they fail to grow in the absence of air and in the presence of acid, they are killed off in a normal sauerkraut fermentation. Although yeasts are present in considerable numbers and may produce small amounts of alcohol, particularly during the initial stages of the fermentation, the predominant organisms are lactic acid formers. The yeasts are not inhibited by acid but they require air for growth. They may produce considerable change in the lactic acid, as well as in the sugars, if allowed to grow and carry on their fermentation. *Bacilli coli* are always present and are responsible for considerable gas formation, but they are present as a contamination and their activities result in injury rather than benefit to the quality of the sauerkraut. Butyric acid bacteria are also highly undesirable. If the development of yeasts, *B. coli* and butyric organisms can be prevented, or at least reduced to a minimum, the quality of the product will be improved correspondingly.

As the thermal death-point of the lactic acid bacillus is about one hundred forty degrees Fahrenheit (140° F.) and that of yeast is one hundred forty-five to one hundred fifty degrees Fahrenheit (145° to 150° F.), any temperature exceeding one hundred fifty degrees Fahrenheit (150° F.) should be effective in destroying all organisms in cabbage which effect or affect fermentation.

Le Fevre recommended the addition of pure cultures of selected lactic acid organisms, and as a result an improved product was obtained by the use of pure cultures in his commercial-scale experiments. The organisms were grown in sterilized cabbage, and this culture in turn was used for inoculation of tanks of shredded cabbage for making sauerkraut.

*The invention*

Objects of this invention are to provide fermented cabbage juice which has less of the undesirable flavor of conventional sauerkraut juice; which has more of the desirable lactic fermentation flavor than conventional sauerkraut juice; which contains more of the available nutritional and therapeutic including vitamin food values than conventional sauerkraut juice; and which may contain less salt than that present in conventional sauerkraut juice; to provide fermented cabbage juice of the lactic acid fermentation type which is distinctly different from conventional sauerkraut juice; to provide fermented juices of other vegetables in addition to cabbage; to provide such other juices having the advantages referred to above; to speed the fermentation and to make the fermentation period shorter without the prior accompanying disadvantage of increased spoilage; to provide processes to accomplish the aforesaid objects; and other objects will become apparent on reading this specification.

Instead of merely shredding the cabbage as has been conventional for the sauerkraut fermentation, I comminute the cabbage very finely, not only to open the maximum amount of juice cells and thus liberate the maximum amount of juice, but also to liberate the maximum amounts of food values present and permit their easy separation from the vegetable fiber. With this in view, I prefer to treat the vegetable in a rotary machine which grinds or comminutes it, to liberate some of the juice and then promptly quickly and forcibly remove such liberated juice, as for example by centrifuging through a screen, whereupon it promptly again comminutes the remaining coarser solids and again promptly forcibly separates them from the liquid separated in the second comminuting step. The volume of material treated in the later comminuting step is less than that treated in the first one due to removal of juice and perhaps to compacting of the solids. The series of steps of comminuting and separating may be repeated as many times as may be found desirable. The access of sufficient air to cause harm in the product is to be prevented. Any later comminution step is made easier and comminution therein more complete by depriving the solids of fluent liquids which wet them, namely those liberated in the earlier comminuting step. It is more difficult to comminute solids when mixed with a large proportion of liquid than after removal of such liquid therefrom. A machine involving these principles of operation is described and claimed in the application of Henry G. Schwarz for Centrifugal extractors, Serial No. 54,795, filed Dec. 17, 1935. The juices resulting from the different centrifuging steps may be combined for further treatment or they may be separately further treated.

Liberation of juice and of food values is much more complete than results from the mere shredding heretofore customary in sauerkraut manufacture. Some of the food values are not soluble in the juice. Cabbage or other vegetable juice consisting entirely of clear liquid and with no solids therein lacks some of the food values naturally present in the vegetables, and it is therefore not the best product from a physiological or nutritional point of view. The insoluble solid food values, however, are very finely divided and suspended in the liquid and are present in such amounts that while the juice may not be a clear liquid it can nevertheless be properly characterized as a juice. Not only does this method get into the separated juice a large proportion of the food values present in the vegetable, but if properly carried out practically all of such food values may be present therein.

The invention of the Schwarz application referred to above furnishes a process which is not only novel in the art of making acid vegetable juices but which is particularly adapted for providing a much improved juice. It converts the cabbage with great speed into a mass of liquid and very finely comminuted solids with access thereto of almost no air, the solids being in such condition that the coarser fibrous material is easily separated from the liquid and from the finer food value solids which are collected with the liquid as a high value juice.

By fermenting the separated resulting juice, it becomes unnecessary for fermentation to take place in the presence of a considerable amount of inert solid material or for the sugars and perhaps other ingredients to be drawn out of the solids by osmosis, seepage, or other action, which drawing out occurs only slowly; but everything is speedily made ready for quick fermentation; and the fermentation itself occurs much faster than in conventional sauerkraut manufacture because practically all substances which it is desirable to ferment are in solution and therefore very easily and quickly available to the fermenting organisms. The resulting product contains practically all of the valuable ingredients of the cabbage without the fiber material, and its purity is increased because the period of time in which any undesirable organisms can cause undesirable types of fermentation is shortened.

The juice extracted from the cabbage is fermented in any suitable manner known to those skilled in the art of fermenting cabbage to sauerkraut. It may be allowed to stand, after extraction, at a suitable temperature, with the proper organisms present, or it may be inoculated with the proper organisms, with or without first sterilizing the juice. Salt (NaCl) may be present, if desired, and the amount of salt present may be less than that required for conventional sauerkraut manufacture. The product thus contains less salt than conventional sauerkraut juice and is for this reason excellent in low-salt diets. As an example, an amount of salt equal to two percent (2%) or somewhat less, by weight of the juice, gives good results. The salt should be used by thoroughly mixing it into the juice at any time before fermentation.

The machine treats the vegetables continuously to separate the juice therefrom, and it is so constructed that very little, if any, air contacts the juice or the cut or exposed surfaces of any part of the vegetables. Such juice can be rapidly heated to the proper desired temperature to start the fermentation, preferably to about seventy degrees Fahrenheit (70° F.), the fermentation proceeding in a tank having a water seal to permit discharge of gases from within the container to the outside thereof, without permitting air to enter, into which the material can conveniently be run through a pipe extending close to the bottom of the tank to avoid much splashing and consequent contact with air. Fermentation starts immediately at such temperature, the organisms are in direct contact with the juice and fermentable materials dissolved therein, and fermentation is vigorous. In the normal operation of the machine referred to above, entrance of air thereinto is prevented to a great extent and the products of the machine are delivered with very little, if any air therewith. Gases are quickly generated by the fermentation and these quickly drive out and replace any air present in the fermentation tank, so that almost all of the fermentation proceeds in the complete absence of air. As a matter of safety and better control, it is desirable to withdraw the juice from the machine and subject it to a vacuum which removes any air in the juice, and then it is to be subjected to the fermentation, best at the temperatures now to be referred to.

The gas-producing cocci grow best at seventy degrees Fahrenheit (70° F.) or lower with about two percent (2%) of salt by weight of juice. These organisms are killed off at approximately seven tenths to one percent (0.7 to 1.0%) acidity, at which point the temperature is best raised to eighty-six degrees Fahrenheit (86° F.) and maintained there to completion of the fermentation. At this higher temperature the non-gas-producing and gas-producing rods function best. Thus, one of the most important factors in developing quality is assured by conducting the fermentation first at seventy degrees Fahrenheit (70° F) or slightly lower, and then at eighty-six degrees Fahrenheit (86° F.) as just described. The *Leuconistoc menisteroides* are the flavor-producing organisms and by this adjustment of temperatures the advantage is gained that they are allowed to outgrow the gas-producing and non-gas-producing rods, which results in the development of a fine flavor. When the acid content reaches the point of destruction of the *Leuconistoc menisteroides* the temperature is raised to the point of best growth of the rods. This temperature adjustment thus gives a close control of the quick development of desirable flavor and also of acid. The fermentation is completed within three or four (3 or 4) days, a much shorter period of time than was formerly possible. Undesired fermentations have thus a much shorter period of time in which to occur than in conventional sauerkraut manufacture, with the result that the putrid flavor ordinarily present in conventional sauerkraut and sauerkraut juice is not present in the products of this invention even without sterilization and inoculation with pure cultures before the fermentation starts.

While it is intended mainly to produce a beverage, yet practically the same advantages accrue even if comminuted fiber solids and juice are in mixed condition during the fermentation, or elese if all of the cabbage is properly fermented after comminution, should this be desired, for the very fine comminution makes the substances which the organisms attack quickly and easily available to them. Such a product, however, might better be characterized as a puree, in contradistinction to a beverage.

The present invention results in much better control of the whole process than is possible with the conventional process of fermenting shredded cabbage. This control can be bettered and made practically perfect by sterilizing or pasteurizing the juice as it comes from the machine, inoculating it with pure cultures of only those organisms it is desired to have present, and then fermenting as described above in water-sealed tanks. For this purpose, the material to be subjected to the fermentation may be flash-heated to one hundred fifty-five degrees Fahrenheit (155° F.), cooled to seventy degrees Fahrenheit (70° F.), inoculated, and then subjected to the fermentation.

The resulting juices are much more acid after than before fermentation. The increased acidity permits of a lower sterilizing temperature for canning or otherwise packaging the juices, and this lower temperature permits of a better flavored product, as will be explained. The maximum temperatures at which microorganisms present or apt to be present can exist are lowered by increased acidity, and organisms which can survive at temperatures above two hundred twelve degrees Fahrenheit (212° F.) are not present in "acid" juices, which term is explained below. Both the temperature and the duration of heating for cooking or sterilizing are factors affecting the flavor of vegetables. A rapid deterioration in flavor results from cooking vegetables at too high a temperature or beyond the time needed at any particular temperature to develop the most perfect cooked flavor. The lower sterilizing temperature possible due to the acidity thus permits of less deterioration of flavor. A pH of four and one-half (4.5) is more or less arbitrarily accepted in the industry as the dividing line between acid and non-acid vegetables or vegetable juices, the so-called "acid" group having a pH below four and one-half (4.5) and the so-called "non-acid" group above four and one-half (4.5). Regulations for sterilization of the "non-acid" group in many jurisdictions require the application of temperatures of two hundred fifty degrees Fahrenheit (250° F.) for periods as long as thirty (30) minutes, while for the "acid" group temperatures of two hundred twelve degrees Fahrenheit (212° F.) or even lower are effective when applied for about the same or even a shorter period of time. The lower temperature permissible for sterilization has another advantage, namely that less coagulation of coagulable material present in the juice may occur at the lower than at the higher temperatures of sterilization. Also, the increased acidity of the juice retards coagulation.

All canned or otherwise packaged juices are generally required to be sterilized by heat, and in the case of the "non-acid" vegetable juices, and fruit juices also, the flavor is deteriorated by the high temperature required for sterilization. Lactic acid fermentation of such juices acidifies them naturally without the addition of an adulterant acid and makes such juices sterilizable at a lower temperature with a consequent less deterioration of the flavor.

The advantages of this invention are many. The fresh juice of ordinary cabbage is green, but conventional sauerkraut juice is yellow. The fermented juice of such cabbage as made according to the present invention retains the green color due to the speed of the process and to the exclusion of air. The loss of green color in the prior product is an indication of loss of therapeutic values which are present in my product.

The outer green leaves of the cabbage are discarded and not shredded and fermented along with the inside leaves in the conventional process of preparation. These green outer leaves are tougher than the inner ones, and for this and perhaps other reasons are discarded although they amount to a substantial proportion of the cabbage. They are rich in values (vitamins, mineral salts, etc.). I use these green leaves, in fact, I need not discard any part of the produce which is clean and not spoiled, and thus all of the different kinds of valuable ingredients of the cabbage are included as raw materials. Most of the green coloring matter of the cabbage is in these outer leaves, and by not discarding them I not only utilize more and and in fact all of the raw material, and recover the values in the outer green leaves, but also obtain a juice having a much deeper and richer green color. Time is a factor in affecting color change, and by reason of the much shorter period required for fermentation, the finished, fermented juice, even after packaging, is deep rich green in color. By means of the very fine comminution these values are liberated and enter into my products; and the speed and control of my process insured that they remain present as such.

The preparation of the cabbage for fermentation is speedier than heretofore, and in fact the whole process is speedier. There is no necessity for much contact with air, the chance of contamination is much decreased, the control of the whole process is made easier and a better quality product results. The flavor of the product is improved since the putrid flavor of conventional sauerkraut juice may be avoided and because a better flavor is positively imparted by conducting the fermentation at the temperatures best suited for the different desirable organisms present. Also, there are present in the product more values desired or physiologically required by the consumer. Sauerkraut juice is often prescribed by physicians, and with more different kinds of values and greater amounts thereof, my products will be more suitable. Physicians frequently prescribe a low-salt diet. My product contains less salt than conventional sauerkraut juice and meets this requirement better.

Another great advantage is that a much less volume than formerly is to be fermented for the same amount of product. Shredded material as conventionally used cannot be compacted down to the point of no air spaces without retarding or destroying the possibility of proper fermentation. I avoid this difficulty, no matter whether I ferment the juice only or ferment the whole of the cabbage after it is delivered by the above-mentioned machine. In the first instance the fibrous material is absent, and in both instances the materials to be fermented are compacted to the point of no air spaces with the fermentable materials more easily available to the organisms than in the conventional process.

Lactic cabbage juice made according to the present invention has a pleasant flavor and tang and it can be mixed with other juices to add zest thereto. If mixed with unfermented juices, the fermented ones lower the pH of the mixture and thus lower the temperature required for sterilization. As one example, celery juice fermented by my process mixed with unfermented celery juice, not only gave it a very pleasant flavor, but the temperature required for sterilizing to kill organisms present was substantially lower than that required for the unfermented celery juice. Sterilization of the mixture at the lower temperature results in a better retention of flavor than sterilizing the unfermented celery juice alone at the higher temperature.

The invention has been described so far, for the purpose of explaining it, with particular respect to the treatment of cabbage. It is applicable to many kinds of produce, some of which, for example, are celery, string beans, green tomatoes, beets, beet tops, turnip tops, lettuce, corn, green peas, as well as many others, and also to mixtures. The various advantages that accrue in the treatment of cabbage generally accrue also in the treatment of other materials and of mixtures, with perhaps some changes which may be due to the particular nature of the material or materials used.

Various details have been referred to for the purpose of describing the invention, which may be changed without departing from the spirit thereof.

I claim:

1. The process of making fermented acid vegetable juice from a vegetable which comprises liberating juice from said vegetable, and subjecting said juice to lactic acid fermentation which consists essentially of two stages, an earlier of said stages being at a temperature more favorable to the growth of flavor-producing lactic acid-forming organisms than to other lactic acid-forming organisms, and a subsequent stage being at a higher temperature more favorable to the growth of said other lactic acid-forming organisms.

2. The process of making fermented acid vegetable juice from a vegetable which comprises liberating juice from said vegetable essentially by comminution thereof, fermenting said juice in the presence of common salt and at a temperature which promotes the growth of flavor-producing lactic acid-forming organisms, such fermentation being continued until the acidity reaches substantially the point at which said flavor-producing lactic acid-forming organisms are killed, and then raising the temperature of fermentation to allow other lactic acid-forming organisms to act.

3. The process of making fermented acid vegetable juice from a vegetable which comprises liberating juice from said vegetable; fermenting said juice in the presence of not more than two per cent (2%) by weight of common salt, and at about seventy degrees Fahrenheit (70° F.) for promoting the growth of flavor-producing lactic acid-forming organisms, said fermentation being continued until the acidity reaches about seven tenths of one per cent to one per cent (0.7% to 1.0%) whereat said flavor-producing lactic acid-forming organisms are killed; and raising the temperature of fermentation to about eight-six degrees Fahrenheit (86° F.) for allowing other lactic acid-forming organisms to act.

JOHN G. SOUTHER.